Dec. 21, 1965    S. CHYTIL    3,224,828
MOTION PICTURE PROJECTOR WITH A MOVABLE FILM GUIDE
Filed Jan. 22, 1964    2 Sheets-Sheet 1

INVENTOR.
Slavomír Chytil
BY

Dec. 21, 1965  S. CHYTIL  3,224,828
MOTION PICTURE PROJECTOR WITH A MOVABLE FILM GUIDE
Filed Jan. 22, 1964  2 Sheets-Sheet 2

INVENTOR.
Slavomír Chytil
BY

United States Patent Office 3,224,828
Patented Dec. 21, 1965

3,224,828
MOTION PICTURE PROJECTOR WITH A MOVABLE FILM GUIDE
Slavomír Chytil, Prerov, Czechoslovakia, assignor to Meopta národni podnik, Prerov, Czechoslovakia
Filed Jan. 22, 1964, Ser. No. 339,540
6 Claims. (Cl. 352—27)

The present invention relates to a motion picture projector provided with a sound adapter, and particularly to a self-threading projector.

In known self-threading projectors the film strip is normally guided from the film gate directly to a feeding sprocket disposed before the take-up reel. When the projector is used in combination with a sound adapter, the film cannot be threaded fully automatically, but must be manually inserted into the sound adapter on which the projector is usually set This disadvantage is overcome by the projector of the present invention.

The present invention resides in one of its aspects, in a motion picture apparatus which has a projector portion and a sound adapter portion. These portions may be held in a predetermined spatial relationship by releasable locating elements. The projector portion has supply and take-up reels and a feed device which moves film from the supply reel in a predetermined path toward the adapter portion, when the portions are in their aforementioned relationship.

Guide means which are movable between an operative and an inoperative position deflect the film from its path toward the takeup reel when in the operative position, and are moved from the inoperative position by actuating means in response to the predetermined relationship of the projector and adapter portions.

Figure 1:
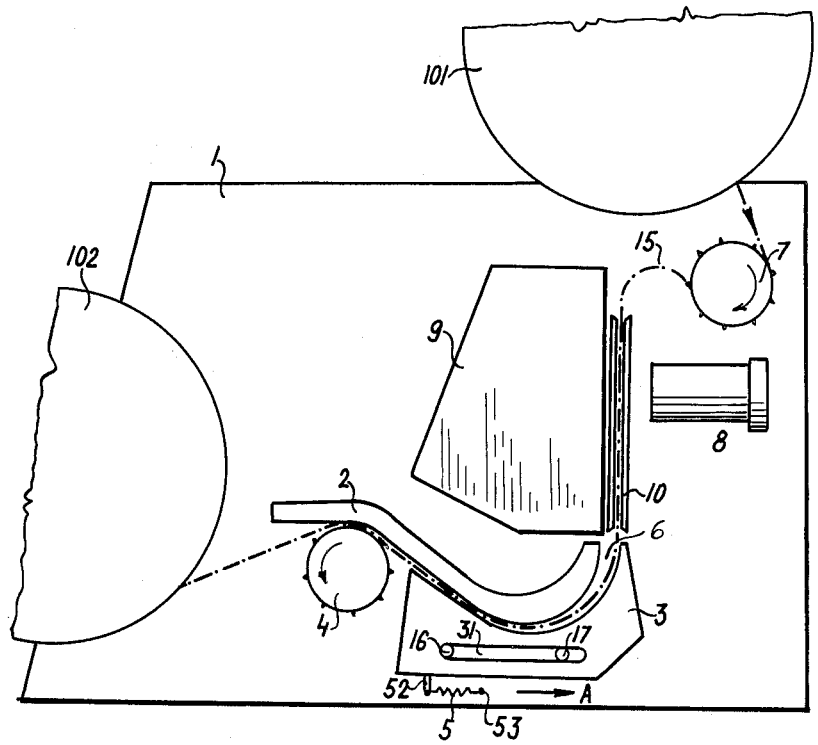
Figure 2:
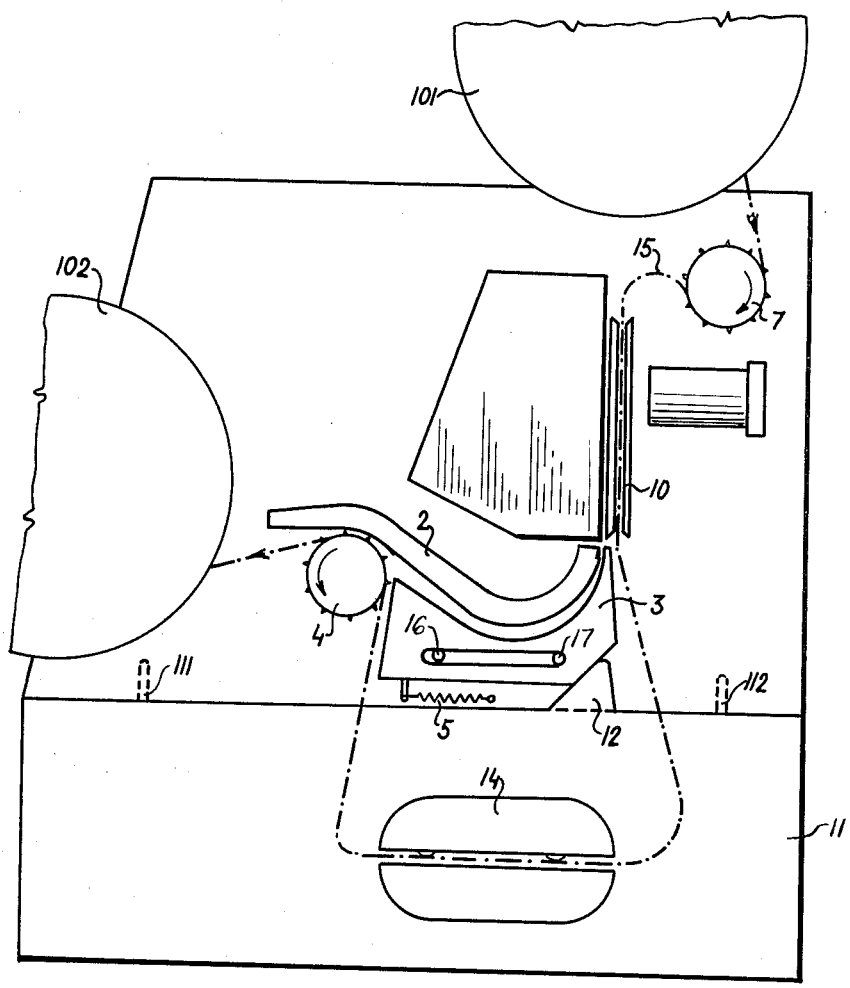

An embodiment of the present invention is shown by way of example in the accompanying drawing wherein:

FIG. 1 shows the projector in partly diagrammatic side elevation without the sound adapter, and FIG. 2 shows the projector with the sound adapter.

Referring now to the drawing in detail, FIG. 1 shows a motion picture projector casing 1 which is provided with a supply reel 101, a takeup reel 102, an upper feeding sprocket 7, and a lower feeding sprocket 4. Further arranged in the casing 1 are two curved guides 2 and 3 disposed below a film gate 10 and defining a film track 6 therebetween. The lower curved guide 3 is provided with a spring 5 secured at one end to a pin 52 on the curved guide 3. The other end 53 of the spring 5 is secured to the casing 1. A slot 31 in the guide 3 forms a guide way for pins 16 and 17 rigidly mounted on the casing 1. In FIG. 1 are also schematically shown a lamp housing 9, a projection lens 8, and a film strip 15.

When the projector of FIG. 1 is used in combination with a sound adapter, the two units are arranged in a manner shown in FIG. 2. The casing 1 is set on the sound adapter 14 and its proper position is maintained by locating pins 111 and 112 on the sound adapter 14. The top of the sound adapter 14 carries a fixed projecting lug 12. A sound head or pick-up 14 is arranged on the adapter 11.

When the projector is used without the sound adapter 14, as shown in FIG. 1, the film strip is automatically threaded by a non-illustrated mechanism from the supply spool 101 and the feeding sprocket 7 into the film gate 10 wherefrom it is guided by the two curved guides 2 and 3 to the feeding sprocket 4 and at last wound on the takeup reel 102. In this case the lower guide 3 assumes a position shown in FIG. 1, in which it is urged by the spring 5 in the direction of arrow A into abutting engagement with the pin 16.

If the sound adapter is used with the projector, the proper position of the latter on the sound adapter is maintained by the two pins 111 and 112. When the casing is set on the sound adapter 14, the lower curved guide 3 is cammingly engaged by the lug 12 which shifts the guide 3 against the suppresses tension of the spring 5 into the position shown in FIG. 2 in which the guide 3 abuts against the pin 17. During automatic film insertion, the film strip 15 is automatically fed by the non-illustrated mechanism from the feeding sprocket 7 into the film gate 10. Since the guide 3 has been shifted by the lug 12 of the sound adapter 14, the film track 6 between the guides 2 and 3 is closed so that the film strip 15 is fed along a non-illustrated film track of the sound adapter 14 through the sound head 14 and therefrom to the feeding sprocket 4 and the takeup reel 102.

The embodiment described is merely illustrative of the invention and analogous other arrangements including, for example, a pivotally mounted guide will readily suggest themselves. Other modifications may be made in the means for shifting the guide 3 when the sound adapter 14 is used with the projector.

What we claim is:
1. A motion picture apparatus comprising, in combination:
 (a) a projector portion;
 (b) a sound adapter portion;
 (c) releasable locating means for holding said portions in a predetermined spatial relationship, said projector portion including
  (1) supply reel means,
  (2) take-up reel means,
  (3) feed means for moving a film from said supply reel means in a predetermined path toward said adapter portion in said relationship of the portions, and
  (4) guide means movable between an operative position and an inoperative position, said guide means when in said operative position deflecting said film from said path toward said take-up reel means; and
 (d) actuating means responsive to said relationship of said portions for moving said guide means from said operative to the inoperative position thereof.

2. An apparatus as set forth in claim 1 wherein said feed means include a feeding sprocket and a film gate arranged along said path, and said guide means include two guide members, at least one of said guide members being movable and operatively connected to said actuating means for movement thereby when said portions are in said relationship, the movable guide member being arranged in said path after said gate in the direction of film movement in the operative position of the guide means and defining a curved film track from said path toward said take-up reel means with the other guide member.

3. An apparatus as set forth in claim 2, wherein said actuating means include lug means on said sound adapter portion, said lug means engaging said movable guide member for moving the same out of said path when said projector portion and said sound adapter portion are in said spatial relationship.

4. An apparatus as set forth in claim 3, wherein said movable guide member is formed with an elongated slot therein, the guide means including two fixed pins engaging said slot, and longitudinally spaced therein, said guide member being movable on said pins between respective positions of longitudinal abutment against said pins.

5. An apparatus as set forth in claim 4, wherein said guide means include a guide member movable toward and away from a position in said path, and said actuating means include cam means secured to said sound adapter portion and engaging said guide member for moving the same away from said position thereof when said portions are in said predetermined spatial relationship.

6. An apparatus as set forth in claim 5, wherein said sound adapter portion includes a sound head, said path extending toward said sound head.

References Cited by the Examiner
UNITED STATES PATENTS

| | | | |
|---|---|---|---|
| 1,944,039 | 1/1934 | Sweet | 226—198 X |
| 2,023,065 | 12/1935 | Condrad et al. | 352—29 |
| 3,048,081 | 8/1962 | Biedermann et al. | 352—27 |

NORTON ANSHER, *Primary Examiner.*

VANCE A. SMITH, *Assistant Examiner.*